US012113731B2

(12) United States Patent
Sun et al.

(10) Patent No.: US 12,113,731 B2
(45) Date of Patent: Oct. 8, 2024

(54) MULTIPLEXED TRANSMISSION OF DATA PACKAGES TOWARDS A TERMINAL DEVICE

(71) Applicant: Telefonaktiebolaget LM Ericsson (publ), Stockholm (SE)

(72) Inventors: Ying Sun, Täby (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 17/768,888

(22) PCT Filed: Oct. 16, 2019

(86) PCT No.: PCT/SE2019/051020
§ 371 (c)(1),
(2) Date: Apr. 14, 2022

(87) PCT Pub. No.: WO2021/076023
PCT Pub. Date: Apr. 22, 2021

(65) Prior Publication Data
US 2023/0261817 A1 Aug. 17, 2023

(51) Int. Cl.
*H04L 5/00* (2006.01)
*H04L 1/00* (2006.01)
*H04L 1/1867* (2023.01)

(52) U.S. Cl.
CPC .......... *H04L 5/0044* (2013.01); *H04L 1/0068* (2013.01); *H04L 1/189* (2013.01); *H04L 5/006* (2013.01)

(58) Field of Classification Search
CPC ......... H04L 1/189; H04L 1/08; H04L 1/0068; H04L 5/0037; H04L 5/006; H04L 5/0044;
(Continued)

(56) References Cited

U.S. PATENT DOCUMENTS

2018/0288784 A1* 10/2018 Stojanovski ...... H04W 28/0252
2019/0090257 A1*  3/2019 Han ...................... H04W 28/24
(Continued)

OTHER PUBLICATIONS

Author Unknown, "Technical Specification Group Radio Access Network; Study on NR Industrial Internet of Things (IoT); Release 16," Technical Report 38.825, Version 0.1.1, Mar. 2019, 3GPP Organizational Partners, 32 pages.
(Continued)

*Primary Examiner* — Peter Chen
(74) *Attorney, Agent, or Firm* — Withrow & Terranova, PLLC

(57) ABSTRACT

There is provided mechanisms for multiplexed transmission of data packages towards a terminal device. A method is performed by a network node. The method comprises multiplexing, for the terminal device, at least one data package of a first service having a first QoS requirement with at least one of at least two duplicated data packages of a second service having a second QoS requirement, different from the first QoS requirement. The method comprises transmitting the multiplexed data packages towards the terminal device over at least two independent paths. The duplicated data packages are transmitted on mutually different ones of the at least two independent paths.

16 Claims, 7 Drawing Sheets

(58) Field of Classification Search
CPC ... H04L 5/0058; H04L 47/10; H04L 47/2491; H04L 2012/5638
See application file for complete search history.

(56) References Cited

U.S. PATENT DOCUMENTS

2019/0200259 A1    6/2019  Shim et al.
2020/0059821 A1*   2/2020  Wirth ................... H04W 80/02
2021/0022040 A1*   1/2021  Zhu ..................... H04W 80/02

OTHER PUBLICATIONS

Aijaz, Adnan, "Packet Duplication in Dual Connectivity Enabled 5G Wireless Networks: Overview and Challenges," IEEE Communications Standards Magazine, May 29, 2019, 9 pages.
AT&T, et al., "RP-180792: URLLC Scenarios and Enhancements for NR Rel 16," 3GPP TSG RAN Meeting #80, Jun. 11-14, 2018, La Jolla, California, 5 pages.
Mahmood, et al., "Multi-Channel Access Solutions for 5G New Radio," International Workshop on Critical and Massive Connectivity solutions for 5G and Beyong, Apr. 15, 2019, IEEE, 6 pages.
International Search Report and Written Opinion for International Patent Application No. PCT/SE2019/051020, mailed Nov. 3, 2020, 13 pages.

* cited by examiner

MULTIPLEXED TRANSMISSION OF DATA PACKAGES TOWARDS A TERMINAL DEVICE

This application is a 35 U.S.C. § 371 national phase filing of International Application No. PCT/SE2019/051020, filed Oct. 16, 2019, the disclosure of which is incorporated herein by reference in its entirety.

TECHNICAL FIELD

Embodiments presented herein relate to a method, a network node, a computer program, and a computer program product for multiplexed transmission of data packages towards a terminal device. Embodiments presented herein further relate to a method, a terminal device, a computer program, and a computer program product for multiplexed reception of data packages from a network node.

BACKGROUND

In communications networks, there may be a challenge to obtain good performance and capacity for a given communications protocol, given its parameters and the physical environment in which the communications network is deployed.

For example, one parameter when providing good performance and capacity for a given communications protocol in a communications network is to be able to support different services with different quality of service (QoS) requirements.

As a non-limiting example, the new radio (NR) radio interface, developed to form part of the fifth generation (5G) telecommunication system, is designed to provide multiple services, such as enhanced mobile broadband (eMBB; a service for data-driven use cases requiring high data rates across a wide coverage area), ultra-reliable and low latency communication (URLLC; a service with strict requirements on latency and reliability for mission critical communications, such as remote surgery, autonomous vehicles or the Tactile Internet), and machine type communication (MTC), such as massive machine type communications (mMTC; a service needed to support a very large number of served devices in a small area, which may only send data sporadically, such as Internet of Things (IoT) use cases). Each of these services has different technical requirements. For example, the general requirement for eMBB services is high data rate with moderate latency and moderate coverage, whilst for URLLC services the general requirement is low latency and high reliability transmission but moderate data rates. The eMBB service and the URLLC services thus map to a set of different quality of service (QoS) requirements, e.g., in terms of delays and error rates.

Based on the QoS requirement, the network, for example the scheduler, will allocate radio resources, e.g., in the time domain and/or in the frequency domain (for example in terms of time/frequency resources) to each served terminal device by considering the constraints of the maximum number of simultaneous duplication transmissions and the maximum number of duplication transmissions that is afforded with latency requirement, as well as other factors, e.g., radio propagation conditions, data package size, and resource for the possible feedback channels.

In this respect, a served terminal device might support multiple service categories, and several services might be run at the terminal device at the same time. As a non-limiting illustrative example, an URLLC service, defined by a real time online gaming application, might on the terminal device be run at the same time as an eMBB service, defined by a messaging service or a file download service. The real time online gaming application requires low latency and low error rate to ensure a good user experience whereas each of the messaging service and the file download service has less stringent latency requirement. When different services are running at the same time at the terminal device, different retransmission processes and/or bearers are used due to different QoS requirements. For the URRLC use case, a typical packet error rate (PER) is in the order of $10^{-6}$ with a packet delay budget (PDB) of 1ms. Two typical conventional alternatives are at the physical (PH) protocol layer to 1) handle data streams with different QoS requirements by scheduling the different data streams individually, and 2) jointly encode the different data streams using the lowest packet error rate target of the different services.

Both alternatives are inefficient in terms of radio resource usage. For example, the data packages of the URLLC service is usually small but requires high reliability and low latency. Alternative 1) would always prioritize the URLLC package because of the latency requirement but would also leave lots of radio resources unused due to the small package size. It also requires the terminal device to have separate encoders for each service. In contrast, alternative 2) would require an unnecessary amount of radio resources to transmit data that does not require high reliability. To overcome this issue, the data packages of the different services should be scheduled separately. However, this will inevitably increase the latency.

Hence, there is still a need for improved transmission of data packages of different services towards the same terminal device.

SUMMARY

An object of embodiments herein is to provide efficient transmission of data packages of two different services not suffering from the issues noted above, or where the above issues at least are reduced or mitigated.

According to a first aspect there is presented a method for multiplexed transmission of data packages towards a terminal device. The method is performed by a network node. The method comprises multiplexing, for the terminal device, at least one data package of a first service having a first QoS requirement with at least one of at least two duplicated data packages of a second service having a second QoS requirement, different from the first QoS requirement. The method comprises transmitting the multiplexed data packages towards the terminal device over at least two independent paths. The duplicated data packages are transmitted on mutually different ones of the at least two independent paths.

According to a second aspect there is presented a network node for multiplexed transmission of data packages towards a terminal device. The network node comprises processing circuitry. The processing circuitry is configured to cause the network node to multiplex, for the terminal device, at least one data package of a first service having a first QoS requirement with at least one of at least two duplicated data packages of a second service having a second QoS requirement, different from the first QoS requirement. The processing circuitry is configured to cause the network node to transmit the multiplexed data packages towards the terminal device over at least two independent paths. The duplicated data packages are transmitted on mutually different ones of the at least two independent paths.

According to a third aspect there is presented a network node for multiplexed transmission of data packages towards a terminal device. The network node comprises a multiplex module configured to multiplex, for the terminal device, at least one data package of a first service having a first QoS requirement with at least one of at least two duplicated data packages of a second service having a second QoS requirement, different from the first QoS requirement. The network node comprises a transmit module configured to transmit the multiplexed data packages towards the terminal device over at least two independent paths. The duplicated data packages are transmitted on mutually different ones of the at least two independent paths.

According to a fourth aspect there is presented a computer program for multiplexed transmission of data packages towards a terminal device. The computer program comprises computer program code which, when run on processing circuitry of a network node, causes the network node to perform a method according to the first aspect.

According to a fifth aspect there is presented a method for multiplexed reception of data packages from a network node. The method is performed by a terminal device. The method comprises receiving multiplexed data packages from the network node. The multiplexed data packages have been sent over at least two independent paths. The multiplexed data packages have been multiplexed from at least one data package of a first service having a first QoS requirement and at least one of at least two duplicated data packages of a second service having a second QoS requirement, different from the first QoS requirement. The duplicated data packages have been transmitted on mutually different ones of the at least two independent paths.

According to a sixth aspect there is presented a terminal device for multiplexed reception of data packages from a network node. The terminal device comprises processing circuitry. The processing circuitry is configured to cause the terminal device to receive multiplexed data packages from the network node. The multiplexed data packages have been sent over at least two independent paths. The multiplexed data packages have been multiplexed from at least one data package of a first service having a first QoS requirement and at least one of at least two duplicated data packages of a second service having a second QoS requirement, different from the first QoS requirement. The duplicated data packages have been transmitted on mutually different ones of the at least two independent paths.

According to a seventh aspect there is presented a terminal device for multiplexed reception of data packages from a network node. The terminal device comprises a receive module configured to receive multiplexed data packages from the network node. The multiplexed data packages have been sent over at least two independent paths. The multiplexed data packages have been multiplexed from at least one data package of a first service having a first QoS requirement and at least one of at least two duplicated data packages of a second service having a second QoS requirement, different from the first QoS requirement. The duplicated data packages have been transmitted on mutually different ones of the at least two independent paths.

According to an eight aspect there is presented a computer program for multiplexed reception of data packages from a network node, the computer program comprising computer program code which, when run on processing circuitry of a terminal device, causes the terminal device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these network nodes, these terminal devices, these computer programs, and this computer program product, provide efficient transmission of data packages of the two different services.

Advantageously these methods, these network nodes, these terminal devices, these computer programs, and this computer program product do not suffer from the issues noted above.

Advantageously these methods, these network nodes, these terminal devices, these computer programs, and this computer program product enable maximization of the resource usage for the first service in the presence of the second service when the terminal device does not support parallel decoding processes.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise.

The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
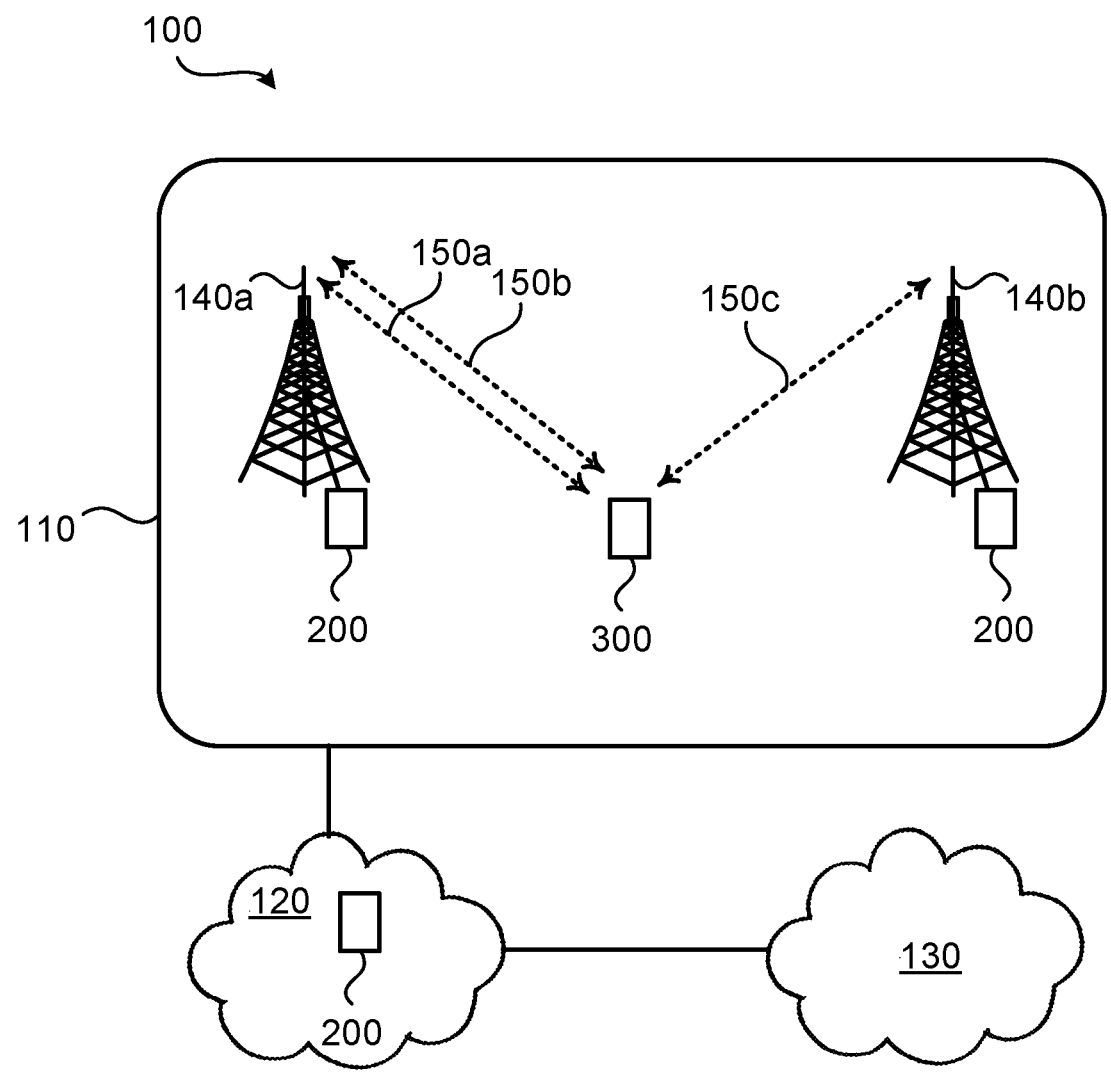
FIG. 1 is a schematic diagram illustrating a communication network according to embodiments.

FIG. 1 is a schematic diagram illustrating a communication network 100 where embodiments presented herein can be applied. The communication network 100 comprises a radio access network 110, a core network 120, and a service network 130.

Transmission and reception points 140a, 140b are controlled by a network node 200 and provided in the radio access network 110 to, via paths 150a, 150b, 150c, provide network access to terminal a device 300 served by the network node 200. The terminal device 300 is thereby enabled to access services, and exchange data with, the service network 130. Each path 150a, 150b, 150c might correspond to a radio link.

Each of the paths 150a, 150b, 150c might be served by a respective transmission and reception point 140a, 140b. Alternatively, each of the paths 150a, 150b, 150c might be served by a respective antenna array (at either one or more transmission and reception points 140a, 140b). According to some embodiments, the paths 150a, 150b, 150c have uncorrelated radio conditions.

The transmission and reception points 140a, 140b might be part of, integrated with, or collocated with, the network node 200. Alternatively, the transmission and reception points 140a, 140b are physically separated from the network node 200. The network node 200 might be part of, integrated with, or collocated with, a radio access network node or a core network node. For example, the network node 200 might be a radio access network node, radio base station, base transceiver station, node B (NB), evolved node B (eNB), gNB, or access point. The terminal device 300 might be a portable wireless device, mobile station, mobile phone, handset, wireless local loop phone, user equipment (UE), smartphone, laptop computer, tablet computer, network equipped vehicle, or the like.

As noted above, there is a need for improved transmission of data packages of different services towards the same terminal device 300. At least some of the herein disclosed embodiments are based on data package duplication and, optionally, buffer split to efficiently multiplex data packages of two different services for the same terminal device 300.

The embodiments disclosed herein in particular relate to mechanisms for multiplexed transmission of data packages towards a terminal device 300 and multiplexed reception of data packages from a network node 200. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300, a method performed by the terminal device 300, and a computer program product comprising code, for example in the form of a computer program, that when run on processing circuitry of the terminal device 300, causes the terminal device 300 to perform the method.

Figure 2:
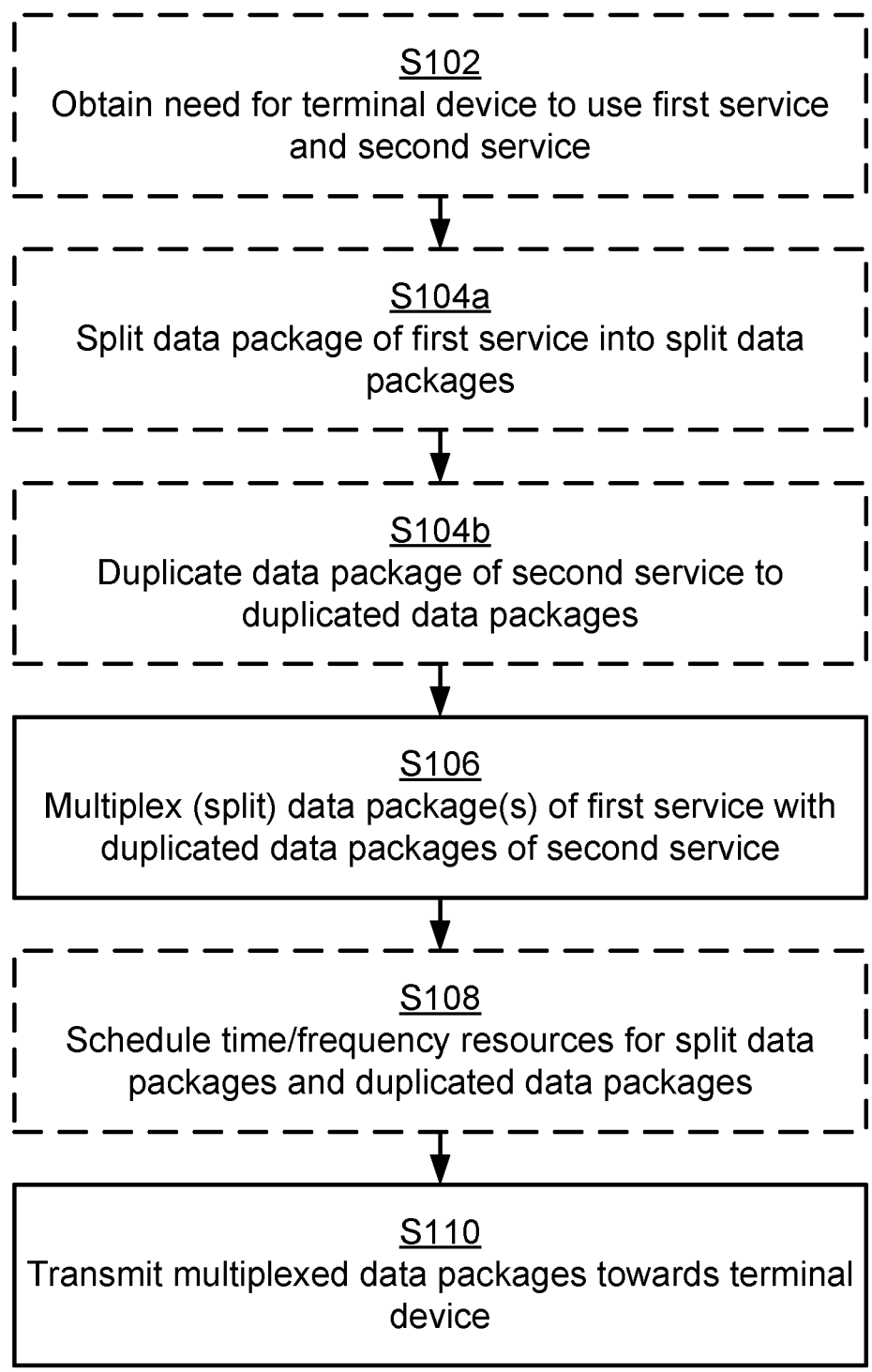
FIGS. 2 and 8 are flowcharts of methods according to embodiments.

Reference is now made to FIG. 2 illustrating a method for multiplexed transmission of data packages towards a terminal device 300 as performed by the network node 200 according to an embodiment.

The network node 200 utilizes data package duplication to efficiently multiplex at least one data package of a first service with at least one data package of a second service for the same terminal device 300. In particular, the network node 200 is configured to perform action S106:

S106: The network node 200 multiplexes, for the terminal device 300, at least one data package of a first service with at least one of at least two duplicated data packages 420a, 420b, 420c of a second service. The first service has a first QoS requirement. The second service has a second QoS requirement, different from the first QoS requirement.

The multiplexed data packages are transmitted over independent paths 150a, 150b, 150c. In particular, the network node 200 is configured to perform action S110: S110: The network node 200 transmits the multiplexed data packages towards the terminal device 300 over at least two independent paths 150a, 150b, 150c. The at least two duplicated data packages 420a, 420b, 420c are transmitted on mutually different ones of the at least two independent paths 150a, 150b, 150c.

Embodiments relating to further details of multiplexed transmission of data packages towards a terminal device 300 as performed by the network node 200 will now be disclosed.

As is understood from the present disclosure, the term duplicated data package is to be understood as referring to at least two identical copies of the same data package, i.e., that there are N duplicated data packages (or N duplications of a data package), where N>1, implies that there are N identical copies of one and the same data package.

If there is only one path 150a available for data packages of the first service, then the data package of the first service cannot be split but is still multiplexed as in action S106 with one of the duplicated data packages 420a, 420b, 420c of the second service. However, if there are at least two paths 150a, 150b, then the data package of the first service might be split. In some aspects, the data package of the first service is thus split. One duplicated data package 420a, 420b, 420c might then be multiplexed with one split data package 410a, 410b of the first services. In particular, according to an embodiment, one data package of the first service is split into at least two split data packages 410a, 410b of the first services, and the at least two split data packages 410a, 410b are transmitted on mutually different ones of the at least two independent paths 150a, 150b, 150c. Intermediate reference is here made to FIG. 3 that schematically illustrates a non-limiting example of data package duplication and split where three duplicated data package 420a, 420b, 420c are multiplexed with two split data packages 410a, 410b; duplicated data package 420a is multiplexed with split data package 410a for transmission over path 150a, duplicated data package 420b is to be transmitted over path 150b (without being multiplexed with any data package of the first service), and duplicated data package 420c is multiplexed with split data package 410b for transmission over path 150c.

In some aspects, the network node 200 is configured to perform the splitting of the data package of the first service and/or the duplication of the data package of the second service. In particular, in some embodiments, the network node 200 is configured to perform at least one of (optional)

actions S104a, s104b: S104a: the network node 200 splits a data package of the first service into the at least two split data packages 410a, 410b.

S104b: the network node 200 duplicates a data package of the second service to the at least two duplicated data packages 420a, 420b, 420c.

In other aspects, the at least two duplicated data packages 420a, 420b, 420c are delivered to the network node 200 and/or the at least two split data packages 410a, 410b are delivered to the network node 200. Duplication and split might thus be performed at another entity than the network node 200.

In some aspects the duplication and/or the split is preceded by comparing amount of buffered data packages (for the first service and/or the second service) to a threshold value, where there is one threshold value for each of the first service and the second service. For example, splitting in action S104a might be performed after having verified that the amount of buffered data packages for the first service is larger than a first threshold value for the first service. For example, duplication in action S104b might be performed after having verified that the amount of buffered data packages for the second service is larger than a second threshold value for the second service. As a further example, if the split buffer size of the first service is larger than a third threshold value for multiplexing, then the split data packages of the first service could be multiplexed with the duplicated data packages of the second service in the independent paths. Otherwise, splitting might not be performed, or multiplexing might not be performed.

Other criteria than relating to amount of buffered data packages are also envisaged.

There could be different criteria according to which the data package of the second service is duplicated. According to some embodiments, the first service is associated with a block error rate requirement, and the data package of the second service is duplicated to match the block error rate requirement of the first service.

Figure 4:
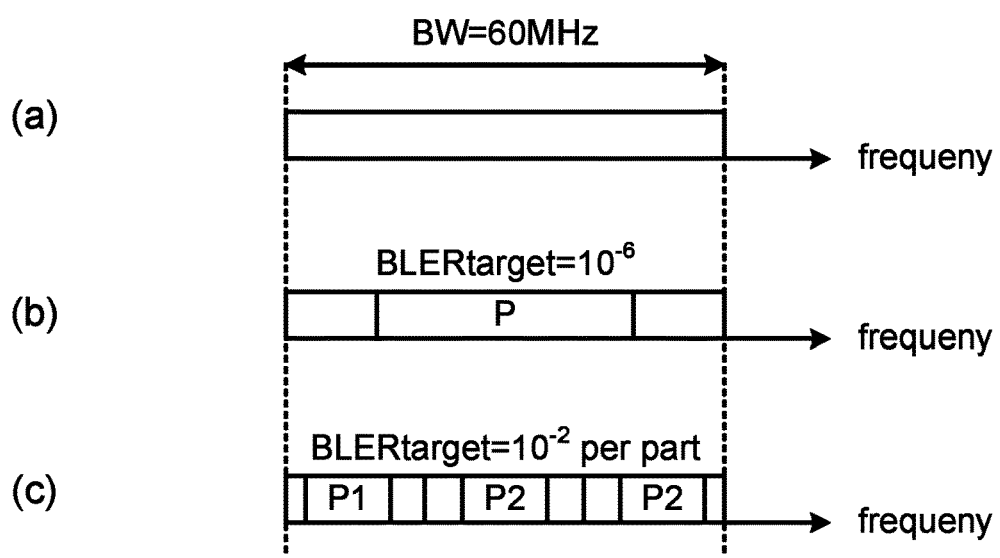
FIG. 4 is a schematic illustration of resources allocated for a data package in a bandwidth interval according to an embodiment.

For example, if a data package have a given block error rate, or packet error rate, requirement, either link adaptation parameters, e.g., modulation and/or code rate, radio resources, etc. could be selected such that one data package can be transmitted with the given block error rate, or packet error rate, requirement, or the same data package could be transmitted N times through independent (uncorrelated or low correlated) paths 150a, 150b, 150c with the same link adaptation parameters resulting in a block error rate, or packet error rate, requirement of N times the given block error rate, or packet error rate, requirement for each data package. Thus, according to some embodiments, all multiplexed data packages are transmitted with the same link adaptation parameter values. The combined data package at the terminal device 300 will satisfy the given block error rate, or packet error rate, requirement. This is illustrated in FIG. 4 which at (a) shows a bandwidth (BW) interval of 60 MHz, at (b) the same bandwidth interval as in (a) and where a part P has been allocated to a data package for a block error rate target, BLERtarget=$10^{-6}$, and at (c), where the same bandwidth interval as in (a) and where three parts P1, P2, P3 has been allocated to the same data package as in (b) but for a block error rate target, BLERtarget=$10^{-2}$ per each part. Provided that the parts are independent the joint BLER target of the three parts equals $10^{-6}$.

In general terms, one or more protocols are utilized in conjunction with the data packages of the first service and the second service being transmitted. Each such protocol could have protocol components implemented at one or more protocol layer. There could be different protocol layers at which the duplication and/or split is performed. According to some embodiments, the at least two split data packages 410a, 410b have been split, and/or the at least two duplicated data packages 420a, 420b, 420c have been duplicated, at any of the protocol layers: the Packet Data Convergence Protocol (PDCP) protocol layer, the Media Access Control (MAC) protocol layer, or the PHY protocol layer.

Figure 5:
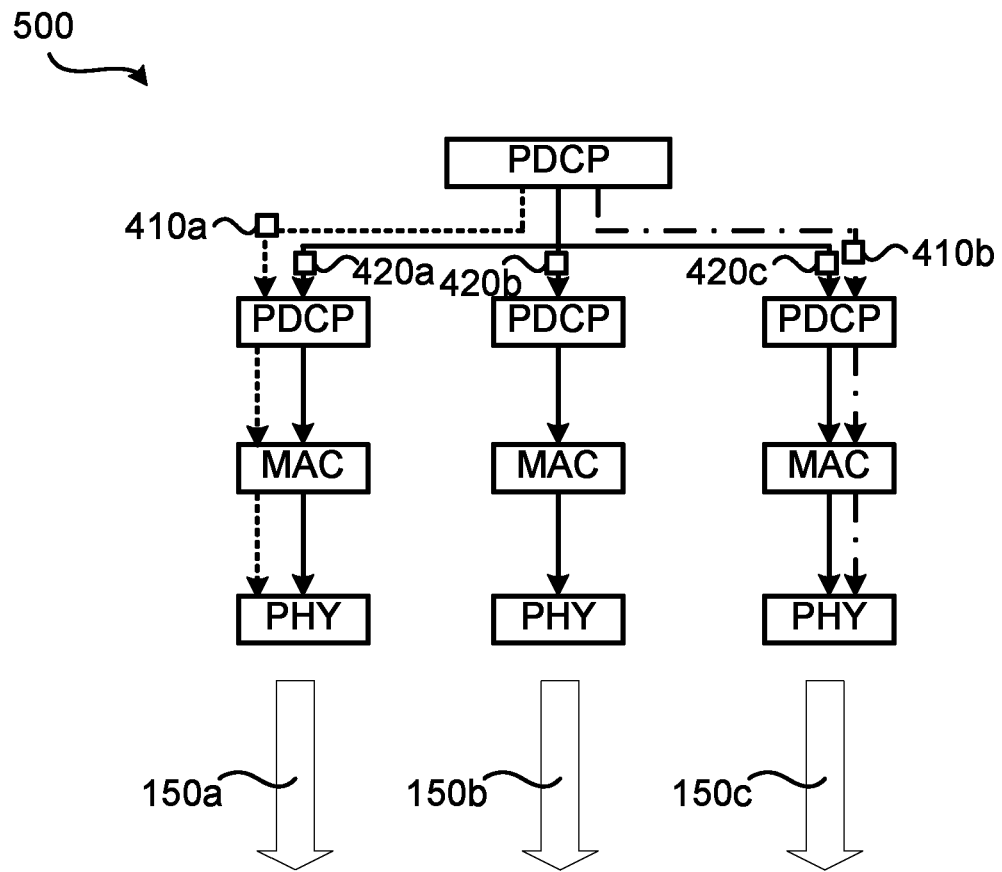
FIGS. 5 and 6 are schematic illustrations of splitting and duplication of data packages according to embodiments.

Intermediate reference is here made to FIG. 5 that at 500 schematically illustrates a non-limiting example of data package duplication and split performed in the PDCP protocol layer. One data package of the first service is split in the PDCP protocol layer into two different split PDCP packages of the first service and one data package of the second service is duplicated into three duplicated PDCP packages, where all three duplicated PDCP packages have the same PDCP sequence number. The split data packages of the first service are to be transmitted on two different paths 150a, 150c and the duplicated data packages are to be transmitted on three different paths 150a, 150b, 150c. As a further example, duplication of one data package of the second service might be performed at the MAC protocol layer, where all duplicated MAC packages thus have the same MAC sequence number.

In some aspects, a respective duplication and/or split is performed at two or more protocol layers. That is, there could be a first duplication at one protocol layer and another duplication (of a thus already duplicated data packages) at another protocol layer. The same applies also to the splitting, if performed. Particularly, the at least two split data packages 410a, 410b have been split, and/or the at least two duplicated data packages 420a, 420b, 420c have been duplicated at a first protocol layer. Then, according to some embodiments, at least one of the at least two split data packages 410a, 410b is split at a second protocol layer lower than the first protocol layer, and/or at least one of the at least two duplicated data packages 420a, 420b, 420c is duplicated at the second protocol layer. That is, a data package of the second service might first be duplicated at PDCP protocol layer and then duplicated again at the MAC protocol layer. The same applies also to the splitting, if performed. One rationale behind this is that the MAC protocol layer commonly supports a larger number of duplicated data packages than the PDCP protocol layer. Therefore, if duplication of data packages of the second service in the PDCP protocol layer cannot meet any required QoS requirement (examples of which will be provided below) for the first service, further duplication of data packages of the second service can be executed in the MAC protocol layer.

Figure 6:
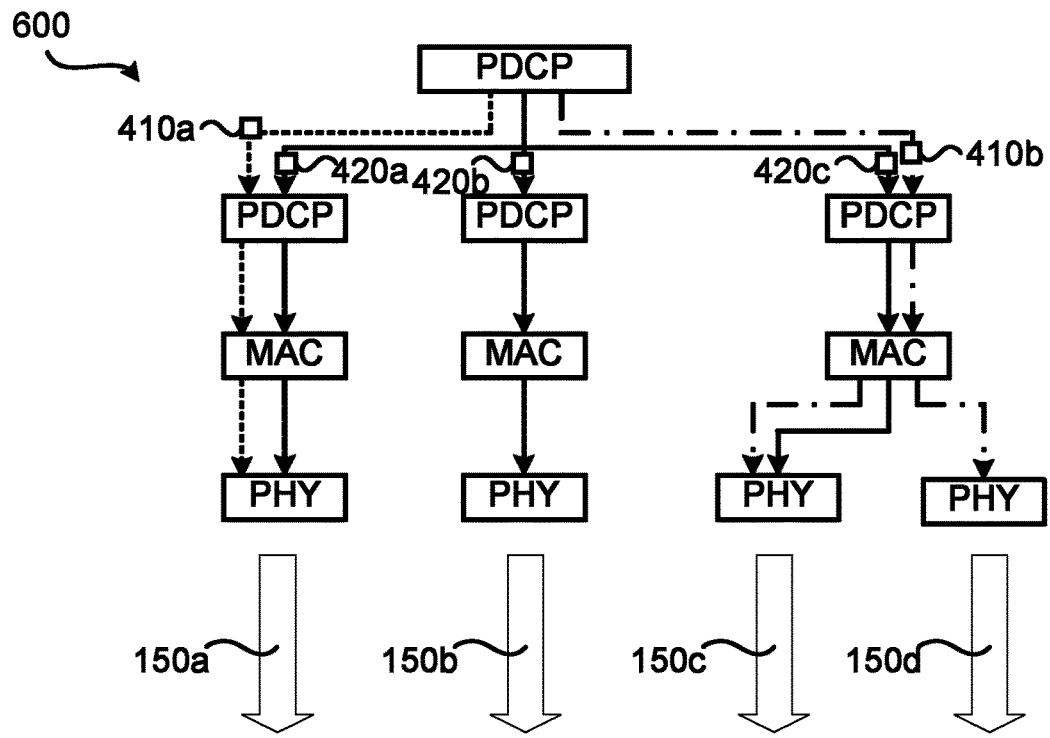

Intermediate reference is here made to FIG. 6 that at 600 schematically illustrates a non-limiting example of data package duplication and split performed in the PDCP protocol layer and a further data package duplication performed in the MAC protocol layer. One data package of the first service is split in the PDCP protocol layer into two different split PDCP packages of the first service and one data package of the second service is duplicated into three duplicated PDCP packages, where all three duplicated PDCP packages have the same PDCP sequence number. At the MAC protocol layer, one of the duplicated data packages is again duplicated, resulting in four duplicated packages of the first service in total, thus requiring four independent paths 150a, 150b, 150c, 150d for transmission.

In general terms, each data package has, or is associated with, a sequence number. This sequence number should remain the same for any duplications of the same data package. That is, according to some embodiments, all the at least two duplicated data packages 420*a*, 420*b*, 420*c* have same sequence number. However, if a data package is split into at least two split data packages 410*a*, 410*b*, then each split data package 410*a*, 410*b* should have its own sequence number.

Aspects relating to retransmission of multiplexed data packages where the transmission in S110 fails will now be disclosed. In general aspects, retransmission of data packages is orchestrated at the PHY protocol layer.

As will be further disclosed below, the second service might have higher requirements on latency than the first service. Such high requirements on latency might not allow retransmission. In some aspects there is therefore no retransmission mechanism activated for duplicated data packages 420*a*, 420*b*, 420*c*. That is, according to some embodiments, in case of failed transmission of any of the at least two duplicated data packages 420*a*, 420*b*, 420*c*, the at least two duplicated data packages 420*a*, 420*b*, 420*c* are not retransmitted. That is, any duplicated data package 420*a*, 420*b*, 420*c* for which transmission fails is dropped. Therefore, the duplicated data packages 420*a*, 420*b*, 420*c* of the second service might be scheduled in a robust way, e.g., by using more independent paths 150*a*, 150*b*, 150*c*, 150*d* (possibly requiring further duplication) than the data package(s) of the first service or using more robust link adaptation settings than the data package(s) of the first service, such the data packages of the second service do not require retransmission in time. In other aspects a fast retransmission mechanism is executed for the duplicated data packages 420*a*, 420*b*, 420*c* of the second service.

The first service might not have as high requirements on latency as the second service. In some aspects, there is therefore a retransmission mechanism activated for split data packages 410*a*, 410*b*. That is, according to some embodiments, in case of failed transmission of any of the at least two split data packages 410*a*, 410*b*, at least that of the at least two split data packages 410*a*, 410*b* for which transmission failed is retransmitted. One non-limiting examples of retransmission mechanism is hybrid automatic repeat request (hybrid ARQ or HARQ) retransmission.

Since there in some aspects is not any retransmission of the duplicated data packages 420*a*, 420*b*, 420*c* of the second service, when retransmission of any data package (split or not) of the first service is performed, the retransmitted data package (split or not) of the first service might be multiplexed, as in S106, but with at least two new duplicated data packages 420*a*, 420*b*, 420*c* (i.e., multiplexed with time/frequency resources allocated to new duplicated data packages 420*a*, 420*b*, 420*c*). Alternatively, the time/frequency resources in the data package (split or not) of the first service could be reserved for a data package of the second service. For example, the retransmitted data package (split or not) of the first service might be multiplexed with time/frequency resources reserved for new duplicated data packages 420*a*, 420*b*, 420*c*. That is, according to some embodiments, when retransmitted, the at least that of the at least two split data packages 410*a*, 410*b* for which transmission failed is multiplexed with time/frequency resources reserved for, or allocated to, new duplicated data packages 420*a*, 420*b*, 420*c*.

Figure 3:
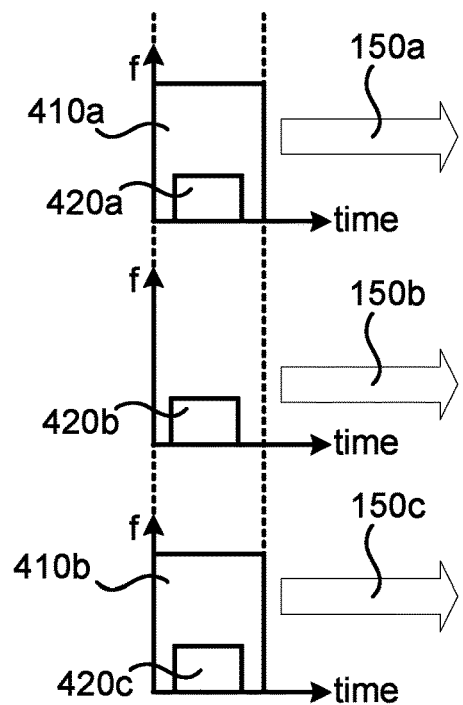
FIGS. 3 and 7 are schematic illustrations of multiplexed data packages according to an embodiment.
Figure 7:
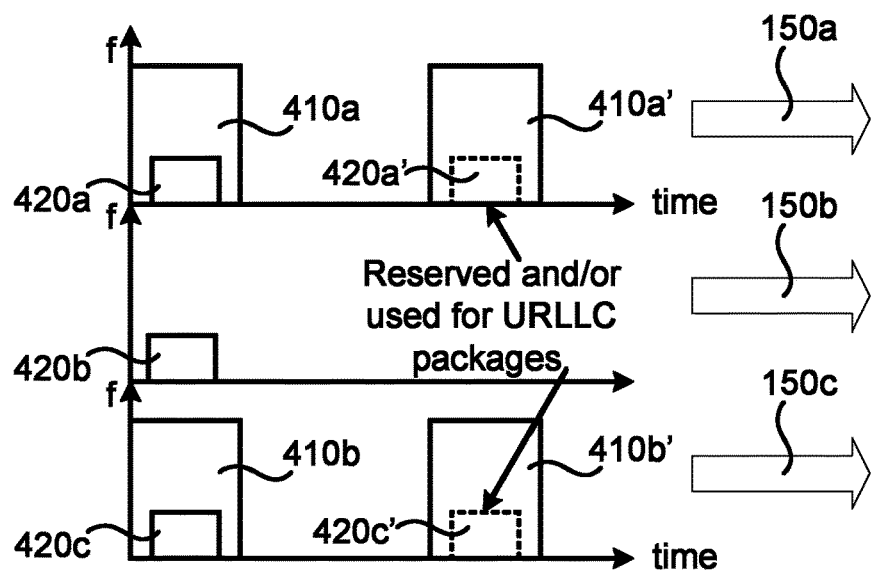

Intermediate reference is here made to FIG. 7 that schematically illustrates a non-limiting example similar to that of FIG. 3 where three paths 150*a*, 150*b*, 150*c* are used for transmission of duplicated data packages 420*a*, 420*b*, 420*c* to provide robustness, and two of them are multiplexed with two split packages 410*a*, 410*b* of the first service. It is here for illustrative purposes assumed that the transmission of these data packages fail. When split data packages 410*a*', 410*b*' of the first service are to be retransmitted, these split data packages 410*a*', 410*b*' are retransmitted together with two new duplicated data packages 420*a*', 420*c*' of the second service.

There could be different ways for the network node 200 to multiplex the at least one data package of the first service with at least one of the at least two duplicated data packages 420*a*, 420*b*, 420*c* of the second service in S106. Aspects relating thereto will now be disclosed.

Non-limiting examples of how the multiplexing might be executed in S106 include, but are not limited to joint encoding, puncturing, and rate-match encoding. In particular, according to some embodiments, multiplexing the at least two split data packages 410*a*, 410*b* with the at least two duplicated data packages 420*a*, 420*b*, 420*c* comprises one of: jointly encoding the at least two split data packages 410*a*, 410*b* with the at least two duplicated data packages 420*a*, 420*b*, 420*c*, puncturing the at least two split data packages 410*a*, 410*b*, rate-matching encoding the at least two split data packages 410*a*, 410*b*.

Jointly encoding the at least two split data packages 410*a*, 410*b* with the at least two duplicated data packages 420*a*, 420*b*, 420*c* might result in the highest number of data being delivered to the terminal device 300 but might also require the highest amount of computational complexity at the network node 200 for multiplexing the data packages and the highest amount of computational complexity at the terminal device 300 for demultiplexing (and decoding) the data packages. The joint encoding might be executed at the PHY protocol layer. In order to reduce the complexity at the terminal device 300, other mechanisms than joint encoding might be used by the network node 200. For example, the network node 200 might be configured to puncture the data package of the first service (for example, eMBB data package) with the data package of the second service (for example, URLLC data package) so that there are sufficient time/frequency resources available for multiplexing the data package of the first service with the data package of the second service. For example, the network node 200 might be configured to rate-match the encoding of the data package of the first service so that there are sufficient time/frequency resources available for multiplexing the data package of the first service with the data package of the second service. When puncturing the at least two split data packages 410*a*, 410*b* (or even the single data package of the first service if no splitting is performed), a retransmission mechanism can be used so that the split data packages 410*a*, 410*b* (or even the single data package of the first service if no splitting is performed) can be correctly decoded at the terminal device 300. For example, any erroneously received data package of the first service is by the terminal device 300 not discard but can be combined with another data package of the first service as received upon retransmission and the terminal device 300 might be configured to again correctly decode the data package of the first service. When using rate-matching, the quality of the split data packages 410*a*, 410*b* (or even the single data package of the first service if no splitting is performed) might be degraded since some of the time/frequency resources originally allocated for encoding data of the first service instead are allocated for encoding data of the second service.

In some aspects, the multiplexing in action S106 is always performed if data packages of the first service and the second service are to be transmitted to the terminal device 300. In other aspects, the multiplexing in action S106 is selectively performed, for example based on the type of applications that the first service and the second service represent, or based on configuration of the network node 200 and the capability of the terminal device 300 to receive multiplexed data packages, or the prioritization of the network node 200 to serve the terminal device 300 compared to the prioritization of the network node 200 to serve other terminal devices, and/or the current load of the network node 200 to serve other terminal devices, etc. In particular, in some embodiments, the network node 200 is configured to perform (optional) action S102: S102: The network node 200 obtains a need for the first service and the second service to be used for the terminal device 300. The data package and the at least two duplicated data packages 420a, 420b, 420c are then multiplexed in response thereto. That is, action S106 is then performed in response to the network node 200 having obtained the need in action S102.

As noted above, in some aspects the multiplexed data packages are transmitted in time/frequency resources. In particular, in some embodiments, the network node 200 is configured to perform (optional) action S108:

S108: The network node 200 schedules time/frequency resources for the at least two split data packages 410a, 410b according to the first QoS requirement and for the at least two duplicated data packages 420a, 420b, 420c according to the second QoS requirement.

The multiplexed data packages are then in action S110 transmitted according to the scheduled time/frequency resources.

There could be different examples of time/frequency resources. Tow non-limiting examples of time/frequency resources are OFDM symbols and parts thereof.

Aspects of the first service and the second service will now be disclosed. As noted above, the first service has a first QoS requirement and the second service has a second QoS requirement, different from the first QoS requirement. In some aspects, the QoS requirement pertains to transmission latency. In some examples, the second service requires lower transmission latency than the first service. In some aspects, the QoS requirement pertains to block error rate. In some examples, the second service requires lower block error rate than the first service. There could be different examples of the first service and the second service where the second service requires lower transmission latency, and/or requires lower block error rate, than the first service. In some examples, the first service is an eMBB service, such as a service for data-driven use cases requiring high data rates across a wide coverage area. In some examples, the second service is a URLLC service, such as a service with strict requirements on latency and reliability for mission critical communications, such as remote surgery, autonomous vehicles or the Tactile Internet.

Figure 8:
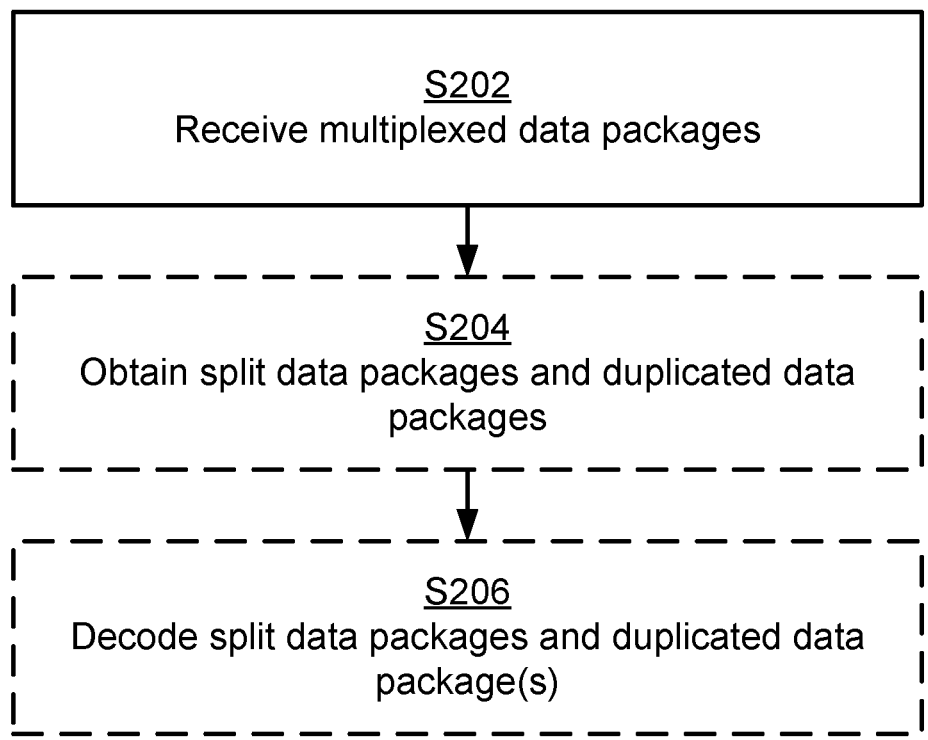

Reference is now made to FIG. 8 illustrating a method for multiplexed reception of data packages from a network node 200 as performed by the terminal device 300 according to an embodiment.

As disclosed above, the network node 200 in S110 transmits the multiplexed data packages towards the terminal device 300 over at least two independent paths 150a, 150b, 150c, 150d. It is assumed that the terminal device 300 receives the multiplexed data. Hence, the terminal device 300 is configured to perform action S202:

S202: The terminal device 300 receives multiplexed data packages from the network node 200. As disclosed above, the multiplexed data packages have been sent over at least two independent paths 150a, 150b, 150c, 150d.

As further disclosed above, the multiplexed data packages have been multiplexed from at least one data package of a first service having a first QoS requirement and at least one of at least two duplicated data packages 420a, 420b, 420c of a second service having a second QoS requirement, different from the first QoS requirement.

As further disclosed above, the at least two duplicated data packages 420a, 420b, 420c have been transmitted on mutually different ones of the at least two independent paths 150a, 150b, 150c, 150d.

Embodiments relating to further details of multiplexed reception of data packages from a network node 200 as performed by the terminal device 300 will now be disclosed.

As disclosed above, in some embodiments, the one data package of the first service has been split into at least two split data packages 410a, 410b of the first services. The at least two split data packages 410a, 410b have then been transmitted on mutually different ones of the at least two independent paths 150a, 150b, 150c, 150d.

There could be different actions performed by the terminal 300 upon having received the multiplexed data packages from the network node 200 in action S202. In some aspects, the multiplexed data packages are demultiplexed for enabling decoding of the data packages. In particular, in one embodiment the terminal device 300 is configured to perform (optional) actions S204 and S206 upon having received the multiplexed data:

S204: The terminal device 300 obtains the at least two split data packages 410a, 410b and the at least two duplicated data packages 420a, 420b, 420c by demultiplexing the multiplexed data packages.

S206: The terminal device 300 decodes the at least two split data packages 410a, 410b and at least one of the at least two duplicated data packages 420a, 420b, 420c.

There could be different ways for the terminal device 300 to handle the received at least two split data packages 410a, 410b upon having been demultiplexed and thus different ways to perform the decoding. In some examples the terminal device 300 in the decoding only utilizes that duplicated data package 420a, 420b, 420c having been received earliest (i.e., first in time) and discards the other duplicated data package 420a, 420b, 420c. This will yield the lowest latency. In some examples the terminal device 300 in the decoding only utilizes that duplicated data package 420a, 420b, 420c having been received with lowest block error rate among all the received duplicated data package 420a, 420b, 420c and discards the other duplicated data package 420a, 420b, 420c. This might yield the highest quality. In other examples the terminal device 300 in the decoding utilizes all the duplicated data package 420a, 420b, 420c by jointly considering all the duplicated data package 420a, 420b, 420c at the protocol layer where the duplication was made. This will yield the highest quality.

In some examples, where the multiplexed data packages comprise at least two split data packages 410a, 410b, 410c, also the at least two split data packages 410a, 410b, 410c are extracted during the demultiplexing. Then during the decoding, the terminal device 300 will join the at least two split data packages 410a, 410b, 410c to one single data packages of the first service.

As above, the duplication might be made in different protocol layers and the joining is thus performed at the same protocol layer as where the split was made.

Figure 9:
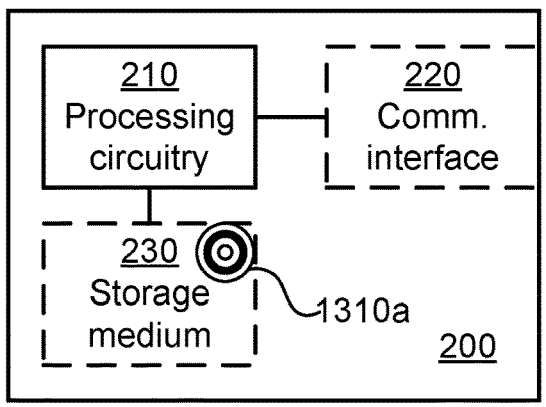
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or actions, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with the terminal device 300 via one or more of the transmission and reception points 140a, 140b as well as with other entities, functions, nodes, and devices of the communication network 100. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
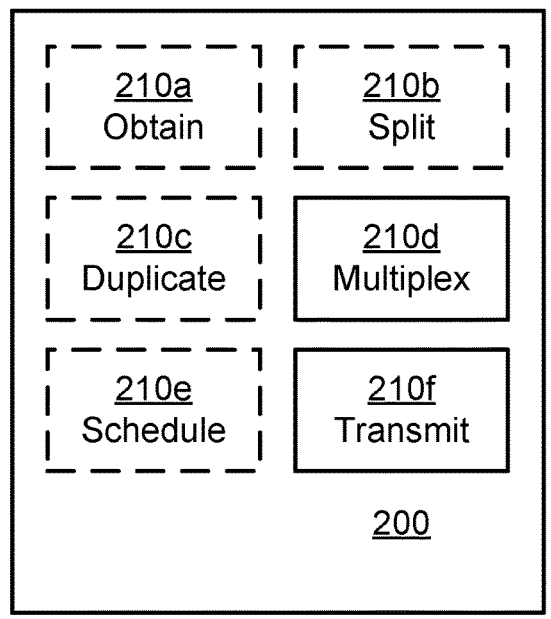
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; a multiplex module 210d configured to perform action S106, and a transmit module 210f configured to perform action S110. The network node 200 of FIG. 10 may further comprise a number of optional functional modules, such as any of an obtain module 210a configured to perform action S102, a split module 210b configured to perform action S104a, a duplicate module 210c configured to perform action S104b, and a schedule module 210e configured to perform action S108. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any actions of the network node 200 as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210a-210f of FIG. 10 and the computer program 1320a of FIG. 13.

Figure 11:
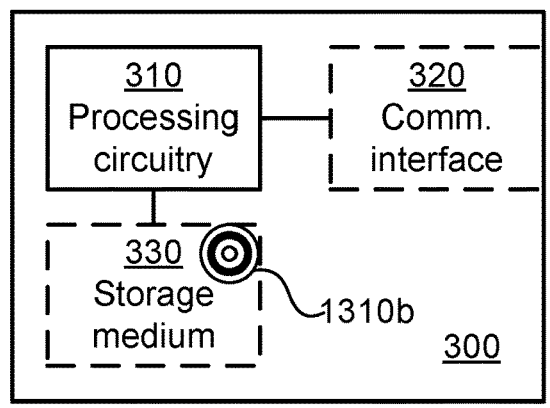
FIG. 11 is a schematic diagram showing functional units of a terminal device according to an embodiment.

FIG. 11 schematically illustrates, in terms of a number of functional units, the components of a terminal device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300 to perform a set of operations, or actions, as disclosed above. For example, the storage medium 330 may store the set of operations, and the processing circuitry 310 may be configured to retrieve the set of operations from the storage medium 330 to cause the terminal device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300 may further comprise a communications interface 320 for communications with the network node 200 via one or more of the transmission and reception points 140a, 140b. As such the communications interface 320 may comprise one or more transmitters and receivers, comprising analogue and digital components.

The processing circuitry 310 controls the general operation of the terminal device 300 e.g. by sending data and control signals to the communications interface 320 and the storage medium 330, by receiving data and reports from the communications interface 320, and by retrieving data and instructions from the storage medium 330. Other components, as well as the related functionality, of the terminal device 300 are omitted in order not to obscure the concepts presented herein.

Figure 12:
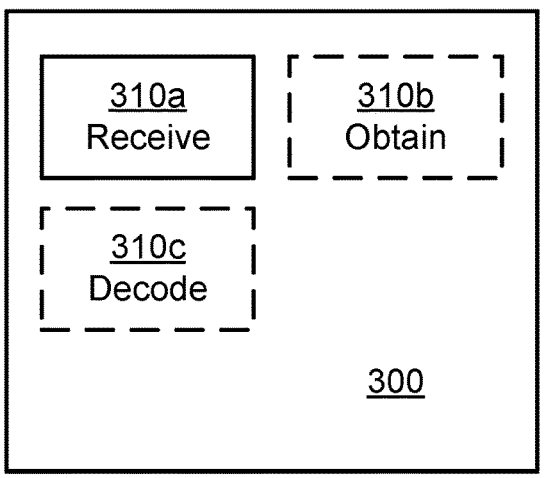
FIG. 12 is a schematic diagram showing functional modules of a terminal device according to an embodiment.

FIG. 12 schematically illustrates, in terms of a number of functional modules, the components of a terminal device 300 according to an embodiment. The terminal device 300 of FIG. 12 comprises a receive module 310a configured to perform action S202. The terminal device 300 of FIG. 12 may further comprise a number of optional functional modules, such as any of an obtain module configured to perform action S204, and a decode module 310c configured to perform action S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any actions of the terminal device 300 as disclosed herein.

Figure 13:
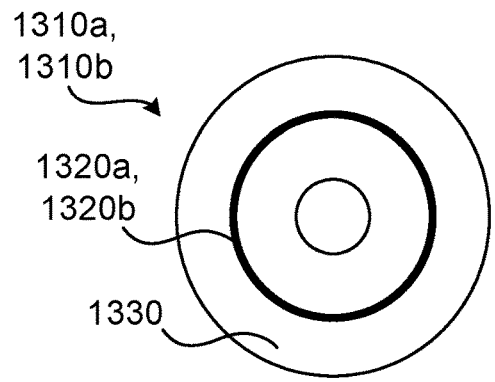
FIG. 13 shows one example of a computer program product comprising computer readable means according to an embodiment.

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any actions of the network node 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any actions of the terminal device 300 as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for multiplexed transmission of data packages towards a terminal device, the method being performed by a network node, the method comprising:
splitting a first data package of a first service having a first Quality of Service, QoS, requirement into at least two different split data packages;
duplicating a second data package of a second service having a second QoS requirement into at least two duplicated data packages, wherein the second QoS requirement is different than the first QoS requirement;
multiplexing, for the terminal device, each of the at least two different split data packages with a different one of the at least two duplicated data packages so as to generate multiplexed data packages; and
transmitting the multiplexed data packages towards the terminal device over at least two independent paths, wherein the multiplexed data packages are transmitted on mutually different ones of the at least two independent paths and each of the at least two independent paths corresponds to a different radio link.

2. The method according to claim 1, wherein the at least two duplicated data packages have been duplicated at a first protocol layer, wherein at least one of the at least two different split data packages is split at a second protocol layer lower than the first protocol layer, and/or wherein at least one of the at least two duplicated data packages is duplicated at the second protocol layer.

3. The method according to claim 1, wherein multiplexing each of the at least two different split data packages with one of the at least two duplicated data packages comprises one of: jointly encoding each of the at least two different split data packages with one of the at least two duplicated data packages, puncturing each of the at least two different split data packages with one of the at least two duplicated data packages, or rate-matching encoding each of the at least two different split data packages.

4. The method according to claim 1, wherein, in case of failed transmission of any of the at least two different split data packages, at least that of the at least two different split data packages for which transmission failed is retransmitted.

5. The method according to claim 1, further comprising:
at least one of scheduling time and frequency resources for the at least two different split data packages according to the first QoS requirement and for the at least two duplicated data packages according to the second QoS requirement, and
wherein the multiplexed data packages are transmitted according to the at least one of scheduling time and frequency resources.

6. The method according to claim 1, wherein all multiplexed data packages are transmitted with same link adaptation parameter values.

7. The method according to claim 1, wherein all the duplicated data packages have same sequence number.

8. The method according to claim 1, further comprising:
obtaining a need for the first service and the second service to be used for the terminal device, and wherein said multiplexing is performed in response thereto.

9. The method according to claim 1, wherein the second service requires lower transmission latency than the first service.

10. The method according to claim 1, wherein the second service requires lower block error rate than the first service.

11. The method according to claim 1, wherein the first service is an Enhanced Mobile Broadband, eMBB, service.

12. The method according to claim 1, wherein the second service is a Ultra-Reliable and Low Latency Communication, URLLC, service.

13. A method for multiplexed reception of data packages from a network node, the method being performed by a terminal device, the method comprising:
receiving multiplexed data packages from the network node, the multiplexed data packages having been sent over at least two independent paths,
wherein the multiplexed data packages are formed from:
multiplexing each of at least two different split data packages with a different one of at least two duplicated data packages, wherein the at least two different split data packages are formed by splitting a first data package of a first service having a first Quality of Service, QoS, requirement into the at least two different split data packages, and the at least two duplicated data packages are formed by duplicating a second data package of a second service having a second QoS requirement into the at least two duplicated data packages, the second QoS requirement being different from the first QoS requirement; and wherein the multiplexed data packages have been transmitted on mutually different ones of the at least two independent paths and each of the at least two independent paths corresponds to a different radio link.

14. The method according to claim 13, further comprising:

obtaining the at least two different split data packages and the at least two duplicated data packages by demultiplexing the multiplexed data packages; and decoding the at least two different split data packages and the at least two duplicated data packages.

15. A network node for multiplexed transmission of data packages towards a terminal device, the network node comprising:

splitting circuitry configured to split a first data package of a first service having a first Quality of Service, QoS, requirement into at least two different split data packages;

duplicating circuitry configured to duplicate a second data package of a second service having a second QoS requirement into at least two duplicated data packages, wherein the second QoS requirement is different than the first QoS requirement;

multiplexing circuitry configured to multiplex, for the terminal device, each of the at least two different split data packages with a different one of the at least two duplicated data packages so as to generate multiplexed data packages; and transmit circuitry configured to transmit the multiplexed data packages towards the terminal device over at least two independent paths, wherein the multiplexed data packages are transmitted on mutually different ones of the at least two independent paths and each of the at least two independent paths corresponds to a different radio link.

16. A terminal device for multiplexed reception of data packages from a network node, the terminal device comprising:

receive circuitry configured to receive multiplexed data packages from the network node, the multiplexed data packages having been sent over at least two independent paths, wherein the multiplexed data packages are formed from:

multiplexing each of at least two different split data packages with a different one of at least two duplicated data packages, wherein the at least two different split data packages are formed by splitting a first data package of a first service having a first Quality of Service, QoS, requirement into the at least two different split data packages, and the at least two duplicated data packages are formed by duplicating a second data package of a second service having a second QoS requirement into the at least two duplicated data packages, the second QoS requirement being different from the first QoS requirement; and wherein the multiplexed data packages have been transmitted on mutually different ones of the at least two independent paths and each of the at least two independent paths corresponds to a different radio link.

* * * * *